United States Patent Office 3,135,804
Patented June 2, 1964

3,135,804
POLYETHER-THIOETHER
Hanswilli von Brachel, Cologne-Sulz, Walter Lohmar, Leverkusen, and Hans Holtschmidt, Cologne-Stammheim, Germany, assignors to Farbenfabriken Bayer Aktiengesellschaft, Leverkusen, Germany, a corporation of Germany
No Drawing. Filed Mar. 28, 1961, Ser. No. 98,757
Claims priority, application Germany Apr. 2, 1960
3 Claims. (Cl. 260—609)

The present invention relates to polyether-thioethers and a process for producing the same. More particularly it concerns polyether-thioethers of the general formula $R_1$—O—$(CHR_2$—$CHR_3$—O$)_m$—$(CHR_4$—$CHR_5$—S—$CHR_6$—$CHR_7$—O$)_n$—$(CHR_8$—$CHR_9$—O$)_p$—$R_{10}$ wherein $R_1$ and $R_{10}$ stand for linear or branched alkyl radicals with 1 to 22, preferably 3 to 18 carbon atoms, $R_2$, $R_3$, $R_4$, $R_5$, $R_6$, $R_7$, $R_8$ and $R_9$ denote hydrogen and/or identical or different linear or branched alkyl radicals with 1 to 12 carbon atoms, and $m$, $n$ and $p$ are whole numbers from 1 to 10, preferably 1 to 5.

According to the invention these polyether-thioethers are obtained by heating alkoxylation products of aliphatic monovalent alcohols with dihydroxyalkyl sulfides in the presence of acid or acid-forming compounds.

Examples of alkoxylation products of monovalent alcohols suitable for carrying out the process according to the invention are the monomethyl, monoethyl, monopropyl, monobutyl, monoisobutyl, monoheptyl, monoisooctyl, monododecyl, monoisododecyl and monocetyl ether of mono-, di-, tri-, tetra- or pentaethylene glycol, of mono-, di-, tri-, tetra- or decapropylene glycol as well as monoalkyl ethers which are obtainable by reacting aliphatic monovalent alcohols simultaneously or in any order with ethylene or propylene oxide.

As dihydroxyalkyl sulfides there may be mentioned for example thiodiglycol, $\beta,\beta'$-dimethyl-thiodiglycol, $\beta$-ethyl-thiodiglycol, $\beta,\beta'$-diethyl-thiodiglycol as well as the products containing 2 to 4 sulfur atoms which are formed by the condensation of these dihydroxyalkyl sulfides with themselves such as 1,11-dihydroxy-(3,9-dithia-6-oxa)-undecane.

Examples of compounds which have an acid reaction or form acids under the given reaction conditions are p-toluene sulfonic acid, orthophosphoric acid, pyrophosphoric acid, metaphosphoric acid, phenylphosphoric acid, diphenylphosphoric acid and phosphoric acid monophenyl ester, ammonium phosphate, sodium phosphate, potassium bisulfate, triethyl phosphate, methyl toluene sulfonate, dimethyl sulfate and maleic acid anhydride.

The temperature for heating the components lies advantageously between 100–220° C., preferably between 140–200° C.

The proportions of the alkoxylation products of aliphatic monovalent alcohols, dihydroxyalkyl sulfides and the acid or acid-forming compounds to be used may vary within wide limits. Suitable proportions may easily be established by experiments. In general, it is advisable to use the alkoxylation products of aliphatic monovalent alcohols and the dihydroxyalkyl sulfides in a molecular ratio of from 5:1 to 2:5; the quantities of acid or acid-forming compounds are generally 0.01–5%, preferably 0.1–1.5% referred to the weight of the starting components. Heating of the reaction components is advantageously continued until practically all the hydroxyl groups of the dihydroxyalkyl sulfides are etherified. The reaction mixture is then neutralised and unreacted starting materials are washed out or distilled off.

The polyether-thioethers produced according to the invention are generally thinly liquid, pale oils and may be used in many ways. Since they are distinguished by good viscosity-temperature properties and alter their viscosity only very slightly even under pressure, they are especially suitable for lubricants, above all for high-duty bearings, toothed wheel gears, worm gears, hydraulics and for metal working; in these cases they may also be employed, if desired, together with lubricant additives, for example those based on phenols or aromatic amines. The oils obtained according to the present invention are not saponifiable nor hydrolytically splittable; they even have a certain water absorbing capacity. The non-sensitivity towards water is an advantage, for example in lubricating turbines since water-insensitive oils are more age-resistant than water-sensitive oils. The products according to the invention are, moreover, suitable for heat transfer agents, insulating oils, textile assistants and as solvents or additives to high molecular weight compounds.

The following examples serve to illustrate the invention without, however, limiting the scope thereof; the parts are parts by weight.

Example 1

531 parts of diethylene glycol monobutyl ether, produced by reacting n-butanol with ethylene oxide in a molecular ratio of 1:2 in the presence of sodium butylate, 213 parts of thiodiglycol and 5.2 parts of orthophosphoric acid are heated in a distillation apparatus to 185° C. at 760 mm. Hg for 30 hours, at 120 mm. Hg for 8 hours and at 15 mm. Hg for 8 hours while passing through carbon dioxide. About 90 parts of water are thus distilled off. The reaction product is then neutralised at 80–90° C. with a dilute sodium hydroxide solution and blown with steam at 120° for 4 to 5 hours. Thereupon the reaction product is subjected to distillation at 0.1 mm. Hg until the temperature has risen to 110° C. There remain about 600–650 parts of a thinly liquid oil which shows after filtration the following properties:

| | |
|---|---|
| Appearance | Clear |
| Density at 20° C. | 1.061 |
| Viscosity at 50°C. | 2.6E |
| Flash point ° C. | 233 |
| Lubricating power: | |
| (a) Tested on the Almen-Wieland machine— | |
| Bearing pressure kg | >2000 |
| (b) Four ball test according to Boerlage— | |
| Load-carrying capacity (welding) kg | 380 |
| (c) Toothed wheel test— | |
| Maximum load | 12 |
| Wear mg./PSh | <0.1 |

Corrosion test: Cu strip 80 h. at 100° C. negative.

Example 2

Ethylene oxide is passed through 1480 parts of isobutanol in which 3 parts of sodium are dissolved at 100 to 150° C. until 1620 parts of ethylene oxide are absorbed. 620 parts of iso-butanol are then distilled off through a column at 106–114° C., 850 parts of thiodiglycol and 35 parts of orthophosphoric acid are added to the residue and the mixture is heated to 185° C. at 760 mm. Hg for 30 hours, at 55 mm. Hg for 8 hours and at 20 mm. Hg for 12 hours. The reaction product is then neutralised at 80–90° C. with a sodium hydroxide solution, blown at 120° C./20 mm. Hg with steam for 5 hours and subjected to distillation at 1 mm. Hg until a sump temperature of 110° C. is attained. After filtration of the reaction product 2600 parts of a thinly liquid oil are obtained which has the following properties:

| | |
|---|---|
| Appearance | Clear |
| Density at 20° C. | 1.051 |
| Viscosity at 50° C. | 2.8E |
| Flash point °C. | 227 |
| Lubricating power: | |
| (a) Tested on the Almen-Wieland machine— | |
| Bearing pressure kg. | >2000 |
| (b) Four ball test according to Boerlage— | |
| Load-carrying capacity (welding) kg. | 380 |
| (c) Toothed wheel test— | |
| Maximum load | 12 |
| Wear mg./PSh. | <0.1 |

Corrosion test: Cu strip 80 h. at 100° C. negative.

*Example 3*

1090 parts of the product obtained by reacting 1 mol of 2-ethyl-hexanol with 2 mols of ethylene oxide, 370 parts of thiodiglycol, 17 parts of orthophosphoric and 15 parts of maleic acid anhydride are heated in a distillation apparatus to 185° C. at 760 mm. Hg for 20 hours, at 145 mm. Hg for 8 hours, at 50 mm. Hg for 12 hours and at 15 mm. Hg for 20 hours while passing through carbon dioxide. About 100 parts of water are thus distilled off. The reaction product is then neutralised with 1 n sodium hydroxide solution, blown with steam at 120°/20 mm. Hg for 6 hours and dried for 1 hour at 100–120° C./20 mm. Hg. After filtering off the separated salts about 1200 parts of a light yellow oil are obtained which is very useful as lubricant for turbines. The oil has the following properties:

| | |
|---|---|
| Density at 20° C. | 0.993 |
| Viscosity at 20° C. | 6.6E |
| Flash point °C. | 185 |
| Lubricating power: | |
| Tested on the Almen-Wieland Machine— | |
| Bearing pressure kg. | >2000 |

Corrosion test: Cu strip 80 h. at 100° C. negative.

*Example 4*

1480 parts of the product obtained by reacting 1 mol of 2-ethyl-hexanol with 4 mols of ethylene oxide, 370 parts of thiodiglycol, 17 parts of orthophosphoric acid and 15 parts of maleic acid anhydride are heated and worked up as described in Example 3. 1600 parts of a thinly liquid oil are then obtained which has the following properties:

| | |
|---|---|
| Density at 20° C. | 1.030 |
| Viscosity at 20° C. | 13E |
| Flash point °C. | 233 |
| Lubricating power: | |
| Tested on the Almen-Wieland machine— | |
| Bearing pressure kg. | >2000 |

Corrosion test: Cu strip 80 h. at 100° C. negative.

Aqueous emulsions of the oil are very useful for metal cutting or drilling.

*Example 5*

2860 parts of the product obtained by reacting 1 mol of n-butanol with 4.8 mols of ethylene oxide, 1000 parts of β,β'-dimethyl-thiodiglycol, 18 parts of orthophosphoric acid and 15 parts of maleic acid anhydride are heated and worked up as described in Example 3. About 3000 parts of an oil are obtained which has the following properties:

| | |
|---|---|
| Density at 20° C. | 1.072 |
| Viscosity at 20° C. | 8.9E |
| Flash point °C. | 212 |
| Lubricating power: | |
| Tested on the Almen-Wieland machine— | |
| Bearing pressure kg. | >2000 |

Corrosion test: Cu strip 80 h. at 100° C. negative.

The oil is very suitable for lubricating gearings.

We claim:

1. A process for producing a polyether-thioether having the formula:

$$R_1-O-(CHR_2-CHR_3-O-)_m$$
$$-(CHR_4-CHR_5-S-CHR_6-CHR_7-O)_n$$
$$-(CHR_8-CHR_9-O)_p-R_{10}$$

wherein $R_1$ and $R_{10}$ are members selected from the group consisting of linear and branched alkyl radicals containing 3 to 18 carbon atoms; $R_2$, $R_3$, $R_4$, $R_5$, $R_6$, $R_7$, $R_8$ and $R_9$ denote a member selected from the group consisting of hydrogen, linear and branched alkyl radicals of 1 to 12 carbon atoms; and $m$, $n$ and $p$ are whole numbers from 1 to 10; comprising heating an alkoxylation product of the formula $$R_1-O-(CHR_2-CHR_3-O)_mH$$

and an alkoxylation product of the formula $$R_{10}-O-(CHR_8-CHR_9-O)_p-H$$

with a dihydroxy alkyl sulfide of the formula $$OH-CHR_4-CHR_5-S-CHR_6-CHR_7-OH$$

in the presence of an effective amount of an acid catalyst.

2. A process according to claim 1 in which the acid catalyst is a member selected from the group consisting of p-toluene sulfonic acid, orthophosphoric acid, pyrophosphoric acid, metaphosphoric acid, phenyl-phosphoric acid, diphenyl-phosphoric acid, phosphoric acid monophenyl ester, ammonium phosphate, sodium phosphate, potassium bisulfate, triethyl phosphate, methyl toluene sulfonate, dimethyl sulfate and maleic acid anhydride.

3. A process according to claim 1 in which the molecular ratio of the alkoxylation products to dihydroxyalkyl sulfide is from 5:1 to 2:5 and the reaction is effected at a temperature of from 100° C. to 220° C.

References Cited in the file of this patent

UNITED STATES PATENTS 2,484,369     Ballard et al.     Oct. 11, 1949